United States Patent
Hamada

(10) Patent No.: US 9,517,964 B2
(45) Date of Patent: Dec. 13, 2016

(54) METHOD FOR PRODUCING OPTICAL FIBER PREFORM

(75) Inventor: Takahiro Hamada, Sakura (JP)

(73) Assignee: FUJIKURA LTD., Tokyo (JP)

(*) Notice: Subject to any disclaimer, the term of this patent is extended or adjusted under 35 U.S.C. 154(b) by 59 days.

(21) Appl. No.: 13/229,196

(22) Filed: Sep. 9, 2011

(65) Prior Publication Data

US 2012/0000249 A1    Jan. 5, 2012

Related U.S. Application Data

(63) Continuation of application No. PCT/JP2010/001801, filed on Mar. 12, 2010.

(30) Foreign Application Priority Data

Mar. 12, 2009 (JP) .................................. 2009-059956

(51) Int. Cl.
    *C03B 37/014* (2006.01)
(52) U.S. Cl.
    CPC .............................. *C03B 37/01446* (2013.01)
(58) Field of Classification Search
    CPC .............................................. C03B 37/01446
    USPC .......................... 65/424, 426, 427, 416, 422
    See application file for complete search history.

(56) References Cited

U.S. PATENT DOCUMENTS

| | | | | |
|---|---|---|---|---|
| 5,259,856 A | * | 11/1993 | Ohga et al. | 65/426 |
| 5,306,322 A | * | 4/1994 | Ishikawa et al. | 65/397 |
| 5,330,548 A | * | 7/1994 | Danzuka et al. | 65/427 |
| 5,713,979 A | * | 2/1998 | Nicholson et al. | 65/424 |
| 7,261,763 B2 | * | 8/2007 | Shirley | 95/45 |
| 2002/0056292 A1 | * | 5/2002 | Kamio et al. | 65/424 |

FOREIGN PATENT DOCUMENTS

| | | |
|---|---|---|
| CN | 1040355 A | 3/1990 |
| CN | 1424269 A | 6/2003 |
| CN | 1626467 A | 6/2005 |
| CN | 1812938 A | 8/2006 |
| JP | 57-034034 A | 2/1982 |
| JP | 64-072936 A | 3/1989 |
| JP | 64-076927 A | 3/1989 |
| JP | 2-204339 A | 8/1990 |
| JP | 11-001336 A | 1/1999 |
| JP | 2002-068770 A | 3/2002 |

(Continued)

OTHER PUBLICATIONS

Office Action issued by Chinese Patent Office in Chinese Application No. 201080011408.9 dated Jun. 3, 2013.

*Primary Examiner* — Queenie Dehghan
(74) *Attorney, Agent, or Firm* — Sughrue Mion, PLLC

(57) ABSTRACT

Provided is a method for producing an optical fiber preform including a dehydration step and a sintering step. In the dehydration step, a porous glass base material is provided to a furnace core tube of a dehydration-sintering furnace, and the porous glass base material is dehydrated using a dehydration agent added with an argon gas. In the sintering step, the porous glass base material dehydrated in the dehydration step is sintered. Further, in the dehydration step, a temperature of the porous glass base material begins to be increased in a condition such that a high heat conductivity gas, having a heat conductivity higher than a heat conductivity of the argon gas, is remaining inside the porous glass base material.

4 Claims, 10 Drawing Sheets

(56) References Cited

FOREIGN PATENT DOCUMENTS

| JP | 2002-187733 A | 7/2002 |
| JP | 2003-183042 A | 7/2003 |
| JP | 2006-056773 A | 3/2006 |

\* cited by examiner

METHOD FOR PRODUCING OPTICAL FIBER PREFORM

CROSS REFERENCE TO RELATED APPLICATIONS

This application is a continuation application based on a PCT Patent Application No. PCT/JP2010/001801, filed Mar. 12, 2010, whose priority is claimed on Japanese Patent Application No. 2009-059956 filed Mar. 12, 2009, the entire content of which are hereby incorporated by reference.

BACKGROUND OF THE INVENTION

1. Field of the Invention

The present invention relates to a method for producing optical fiber preform by a dehydrating and a sintering of a porous glass base material.

2. Description of the Related Art

A conventionally known method to manufacture an optical fiber preform for manufacturing a silica based optical fiber is a method in which a porous glass base material is manufactured using a VAD method, an OVD method, and the like, then a glass particle (soot) included in the porous glass base material is transparently vitrified by a dehydration step, thereby obtaining an optical fiber preform. As a dehydration agent to dehydrate the porous glass base material, chlorine ($Cl_2$), thionyl chloride ($SOCl_2$), carbon tetrachloride ($CCl_4$), and the like are used, and is blended with inactive gas and provided within the dehydration-sintering device.

Conventionally, helium (He) gas has been predominantly used as inactive gas which is blended to the dehydration agent for the purpose of serving as a carrier or for the purpose of dilution, as indicated in Japanese Unexamined Patent Application, First Publication No. 2002-68770; Japanese Unexamined Patent Application, First Publication No. 2002-187733; and Japanese Unexamined Patent Application, First Publication No. 2003-183042. Further, Japanese Unexamined Patent Application, First Publication No. H11-1336 states that, since helium gas has a large gas diffusion coefficient and a large gas solubility coefficient in glass, and since it is less likely that helium gas remains inside the glass compared to nitrogen and the like, helium gas exhibits an effect in which the production of air bubble inside the glass is inhibited.

Helium gas is extremely expensive compared to argon (Ar) gas and nitrogen ($N_2$) gas and the like. Therefore, considering the cost of manufacturing, it is not preferable to use helium gas as the inactive gas to be blended with a dehydration agent in the dehydration step.

However, when argon gas is used as the inactive gas to be blended with a dehydration agent, if the dehydration step is commenced after the furnace core tube containing porous gas is replaced with argon gas, there is a possibility that an inadequacy in dehydration will occur. This is because, argon gas has a low heat conductivity compared to helium gas, leading to a difficulty in heat to be conducted to a center portion of the porous glass base material, and therefore, the temperature of the entire porous glass particle laminated body cannot be elevated to an adequate desired temperature. Meanwhile, when the heating temperature is increased in order to increase the temperature of a central portion of the porous glass base material, the dehydration and vitrification of the surface of the porous glass base material is promoted excessively. Moreover, it becomes difficult for the dehydration agent to diffuse to the interior portion of the porous glass base material, thereby creating a cause of the inadequacy of dehydration.

It is possible to promote the dehydration of the central portion by increasing the amount of processing time, instead of increasing the heating temperature. However, there is a problem in that the productivity drops, and the manufacturing cost increases.

The present invention is made in light of these objectives. An object of the present invention is to provide a method for producing optical fiber preform, which allows a dehydration and a sintering of the porous glass base material to be performed at a lower cost compared to conventional methods, and allows a dehydration to be performed effectively.

SUMMARY

A method for producing an optical fiber preform according to a first embodiment of the present invention includes a dehydration step providing a porous glass base material to a furnace core tube of a dehydration-sintering furnace, and dehydrating the porous glass base material using a dehydration agent added with an argon gas; and a sintering step sintering the porous glass base material dehydrated in the dehydration step. Here, in the dehydration step, a temperature of the porous glass base material begins to be increased in a condition such that a high heat conductivity gas, having a heat conductivity higher than a heat conductivity of the argon gas, is remaining inside the porous glass base material.

A method for producing an optical fiber preform according to a second embodiment of the present invention includes a dehydration step providing a porous glass base material to a furnace core tube of a dehydration-sintering furnace, and dehydrating the porous glass base material using a dehydration agent added with an argon gas; and a sintering step sintering the porous glass base material dehydrated in the dehydration step. Here, in the dehydration step, a temperature of the porous glass base material begins to be increased in a condition such that, after purging an interior of the furnace core tube with a high heat conductivity gas, having a heat transfer coefficient higher than a heat transfer coefficient of the argon gas, the high heat conductivity gas is remaining inside the porous glass base material.

The above method for producing the optical fiber preform may be configured as follows: considering the dehydration step, the dehydration step is commenced after an interior of the porous glass base material is purged with the high heat conductivity gas.

The above method for producing the optical fiber preform may be configured as follows: the high heat conductivity gas is at least one type selected from the group consisting of a helium gas, an air, a nitrogen gas, and a neon gas.

The above method for producing the optical fiber preform may be configured as follows: the high heat conductivity gas is a nitrogen gas.

The above method for producing the optical fiber preform may be configured as follows: when the temperature of the porous glass base material begins to be increased in the dehydration step, 30% to 90% of a volume of the furnace core tube is replaced with an argon.

The above method for producing the optical fiber preform may be configured as follows: when the temperature of the porous glass base material begins to be increased in the dehydration step, 40% to 80% of a volume of the furnace core tube is replaced with an argon.

It is preferable to perform a purge with helium, nitrogen, and the like because it reduces an undesirable incidence in which a particle is created in the optical fiber preform which is being manufactured. Incidentally, in the present specification, performing a purge refers to an exchange of gas inside a furnace core tube with helium, nitrogen, and the like before dehydration. Further, a gas replacement refers to an exchange of gas inside a furnace core with argon gas before sintering.

According to the present invention, the increase in the temperature of a central portion of a porous glass base material may be promoted when a dehydration step is commenced. Further, even when inexpensive argon gas is used as inactive gas being blended with dehydration agent, soot may be dehydrated adequately. Therefore, it is possible to prevent inadequacy in dehydrating, and to lower the cost of the dehydrating step.

EMBODIMENTS FOR CARRYING OUT THE INVENTION

Hereinafter, a method for producing an optical fiber preform according to a first embodiment of the present invention is described with reference to the figures. Incidentally, the description of the present embodiment is provided in order to facilitate the understanding of the gist of the present invention, and does not limit the present invention in any way unless otherwise specifically noted.

Figure 1:
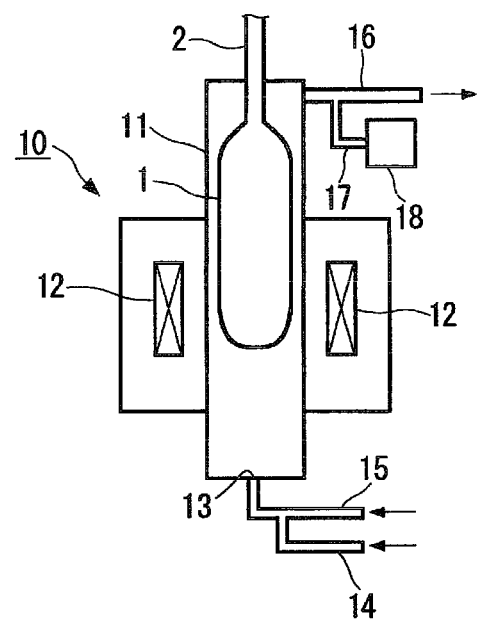
FIG. 1 is a schematic cross sectional view showing an example of a dehydration-sintering device used in a first embodiment of the present invention.
Figure 5:
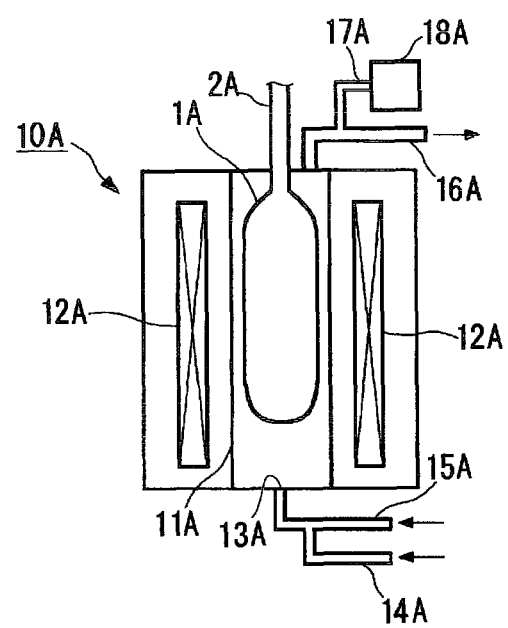
FIG. 5 is a schematic cross sectional view showing another example of a dehydration-sintering device used in an embodiment of the present invention.

FIGS. 1 and 5 show examples of a dehydration-sintering device used in a method for producing an optical fiber preform according to the present embodiment. This dehydration-sintering device 10, 10A includes a furnace core tube 11, 11A containing a porous glass base material 1, 1A supported by a supporting member 2, 2A, a heater 12, 12A provided in a surrounding area of the furnace core tube 11, 11A, a dehydration gas supply port 13, 13A supplying to the furnace core tube 11, 11A, a mixed gas obtained after blending a dehydration agent, which is provided through a dehydration agent flow path 14, 14A, with inactive gas, which is provided through an inactive gas flow path 15, 15A. The dehydration-sintering device 10, 10A also includes an exhaust flow path 16, 16A, which discharges an exhaust from the furnace core tube 11, 11A. The dehydration-sintering device 10, 10A further includes a bifurcation flow path 17, 17A, which is bifurcated from the exhaust flow path 16, 16A for a monitoring of an oxygen meter 18, 18A. In this way, the dehydration agent flow path 14, 14A supplies a dehydration agent. Meanwhile, the inactive gas flow path 15, 15A supplies an inactive gas. A mixed gas, provided by a mixture of the dehydration agent and the inactive gas, is supplied as a dehydration gas.

A method for producing an optical fiber preform according to the present embodiment may be carried out using, for example, the dehydration-sintering device 10, 10A, and includes a dehydration step, in which a porous glass base material 1, 1A (porous soot body) is dehydrated by providing a dehydration gas including inactive gas into the furnace core tube 11, 11A, and a sintering step, in which the dehydrated porous glass base material 1, 1A is sintered. Chlorine ($Cl_2$), thionyl chloride ($SOCl_2$), carbon tetrachloride ($CCl_4$), and the like are used as the dehydration agent. Hereinafter, the dehydration agent may also be referred to as a dehydration gas. The dehydration gas may include argon gas. The dehydration gas is used at a ratio of less than or equal to 10 volume percentage with respect to argon gas. For the furnace core tube 11, 11A, it is possible to use, for example, a muffle made from a silica (silica) glass and a tube made from carbon.

According to the dehydration-sintering device 10 shown in FIG. 1, the porous glass base material 1 is gradually lowered by the supporting member 2, thereby successively heating the porous glass base material 1 from a lower end to an upper end with the heater 12. According to the dehydration-sintering device 10A shown in FIG. 5, the heater 12A may heat the porous glass base material 1A in its entirety.

According to the present embodiment of the present invention, argon gas is used as the inactive gas which is blended with the dehydration agent. Before the temperature of the porous glass base material 1, 1A is elevated in the dehydration step, a gas having a high heat conductivity compared to argon gas (hereinafter, referred to simply as a "high heat conductivity gas") is left inside the porous glass base material 1, 1A.

As a result, the manufacturing cost may be lowered by using inexpensive argon gas as an inactive gas used continuously in the dehydration step. At the same time, before the dehydration step begins, it is possible to increase the heat transfer coefficient of an interior portion of the porous glass particle laminated body of the porous glass base material 1, 1A, thereby preventing an inadequacy in dehydration.

As indicated in the following equation, the heat transfer coefficient h is proportional to the heat conductivity $\lambda$.

$$h = \alpha \times \lambda / L$$

Here, $\alpha$ refers to a coefficient such as a Reynolds (Reynolds) number or a Prandtl (Prandtl) number, which is selected as appropriate according to the condition of the gas (laminated flow, turbulent flow). L refers to a representative length.

Gas having a higher heat conductivity compared to argon gas (0.0163 W·m$^{-1}$·K$^{-1}$) include helium gas (0.1422 W·m$^{-1}$·K$^{-1}$), air (0.0241 W·m$^{-1}$·K$^{-1}$), nitrogen gas (0.0240 W·m$^{-1}$·K$^{-1}$), neon gas (0.0465 W·m$^{-1}$·K$^{-1}$), and the like. Incidentally, heat conductivity at 0° C. of each gas is indicated inside the parenthesis.

According to the present embodiment of the present invention, it is preferable to purge the atmosphere inside the furnace core tube 11, 11A by supplying high heat conductivity gas into the furnace core tube 11, 11A before the dehydration step is started. The supply of the high heat conductivity gas may be made through the inactive gas flow path 15, 15A and the dehydration gas supply port 13, 13A. Alternatively, separate from these inactive gas flow path 15, 15A and the dehydration gas supply port 13, 13A, it is possible to provide to the device, a flow path and a supply port for supplying the high heat conductivity gas. In addition, when the high heat conductivity gas is air, it is possible to use air, which exists inside the furnace core tube 11, 11A before the dehydration process begins.

Incidentally, as shown in the following first to sixth working examples, the first comparative example, the eleventh to sixteenth working examples, and the second comparative example, it is preferable that the gas replacement ratio of the argon gas be greater than or equal to 40 percent and less than or equal to 85 percent (in other words, the mixed gas ratio of air being greater than or equal to 15 percent and less than or equal to 60 percent) if the atmosphere inside the furnace core tube 11, 11A is a mixed gas of argon and air when the temperature of the heater 12, 12A starts to increase.

In order to enhance the effectiveness of increasing the heat transfer coefficient of an interior portion of the porous glass particle laminated body of the porous glass base material 1, 1A, it is preferable to supply high heat conductivity gas at an appropriate level (in terms of volume and time) so that the interior portion of the porous glass particle laminated body is sufficiently purged with high heat conductivity gas. When the high heat conductivity gas is an expensive helium gas, it is not preferable to use helium gas excessively from a cost standpoint. Therefore, it is preferable to set a required amount as appropriate.

When the dehydration step is started, the temperature is elevated by the heater 12, 12A, and dehydration gas is provided to the furnace core tube 11, 11A through the dehydration agent flow path 14, 14A and the inactive gas flow path 15, 15A. Since the porous glass base material 1, 1A is an aggregation of glass particles, the time for gas to disperse to the interior portion is so small as to be ignored, compared to a sintered glass body. Therefore, the supply of the dehydration gas may be started before the starting to elevate the temperature, or at the same time as starting to elevate the temperature, or after the elevation of the temperature has started. However, when the speed of supplying dehydration gas is too fast compared to the speed of increasing the temperature, there is a risk that the interior portion of the porous glass particle laminated body is replaced with dehydration gas before the temperature of the porous glass base material 1, 1A is adequately elevated. Therefore, it is preferable to adjust the supply of the dehydration gas, as appropriate, by taking into consideration the time required to warm up the porous glass particle laminated layer to its interior portion to an adequate, desired temperature, after the elevation of the temperature by the heater 12, 12A starts.

Hereafter, a description is provided in detail with reference to working examples. Throughout the working examples, chlorine gas was used as the dehydration gas. Further, silica based glass base material is the porous base material.

Below, Table 1 shows a dehydration sinter device, purge gas, purge time, oxygen density when the dehydration is started (%), and the gas replacement time with argon.

TABLE 1

| | DEHYDRATION SINTERING DEVICE | PURGE GAS | DURATION OF PURGING (MINUTES) | CONCENTRATION OF O$_2$ WHEN DEHYDRATION IS STARTED (%) | DURATION TIME OF REPLACEMENT WITH ARGON (MINUTES) |
|---|---|---|---|---|---|
| FIRST WORKING EXAMPLE | FIG. 1 | (Air) | | 6 | 60 |
| FIRST COMPARATIVE EXAMPLE | FIG. 1 | (Air) | | <1 | 180 |
| SECOND WORKING EXAMPLE | FIG. 1 | (Air) | | 2 | 120 |
| THIRD WORKING EXAMPLE | FIG. 1 | (Air) | | 3 | 90 |
| FOURTH WORKING EXAMPLE | FIG. 1 | (Air) | | 9 | 30 |
| FIFTH WORKING EXAMPLE | FIG. 1 | (Air) | | 12 | 20 |
| SIXTH WORKING EXAMPLE | FIG. 1 | (Air) | | 13 | 15 |
| SEVENTH WORKING EXAMPLE | FIG. 1 | He | 5 | 0.65 | 15 |
| EIGHTH WORKING EXAMPLE | FIG. 1 | He | 1 | 6.5 | 15 |
| NINTH WORKING EXAMPLE | FIG. 1 | N$_2$ | 1 | 4.5 | 30 |
| TENTH WORKING EXAMPLE | FIG. 1 | N$_2$ | 1 | 6.5 | 15 |
| ELEVENTH WORKING EXAMPLE | FIG. 5 | (Air) | | 6 | 60 |
| SECOND COMPARATIVE EXAMPLE | FIG. 5 | (Air) | | <1 | 180 |
| TWELFTH WORKING EXAMPLE | FIG. 5 | (Air) | | 2 | 120 |
| THIRTEENTH WORKING EXAMPLE | FIG. 5 | (Air) | | 3 | 90 |

TABLE 1-continued

| | DEHYDRATION SINTERING DEVICE | PURGE GAS | DURATION OF PURGING (MINUTES) | CONCENTRATION OF $O_2$ WHEN DEHYDRATION IS STARTED (%) | DURATION TIME OF REPLACEMENT WITH ARGON (MINUTES) |
|---|---|---|---|---|---|
| FOURTEENTH WORKING EXAMPLE | FIG. 5 | (Air) | | 9 | 30 |
| FIFTEENTH WORKING EXAMPLE | FIG. 5 | (Air) | | 12 | 20 |
| SIXTEENTH WORKING EXAMPLE | FIG. 5 | (Air) | | 13 | 15 |

Hereafter, the first working example is described.

After the porous glass base material is contained in the dehydration-sintering device shown in FIG. 1, a gas replacement inside the furnace core tube was commenced with argon gas before increasing the temperature of the heater of the dehydration-sintering device. Incidentally, before the gas replacement with argon gas starts, the interior of the furnace core tube is filled with gas having a higher heat conductivity compared to argon, such as air and the like. The furnace core tube which was used has a dimension of 200 mm in inner diameter and 1500 mm in length. Argon gas was supplied at a flow velocity of 1.5 (l/min). At the same time as this supply, the interior gas was exhausted naturally. The temperature of the heater was increased so that a predetermined dehydration temperature was reached 60 minutes after the gas replacement was started (the dehydration temperature is approximately 1200 to 1400° C.).

When an oxygen density was measured 60 minutes after the gas replacement was started with an oxygen meter (such as the LC-750 manufactured by Toray Engineering Co., Ltd.), which was previously installed on the dehydration-sintering device, the oxygen density was approximately 6%. Further, since the oxygen density immediately after the insertion of the porous glass base material is 20%, the furnace core tube is purged with air at the time of the insertion of the porous glass base material. Accordingly, it may be presumed that 70% of the volume of the furnace core tube is replaced with argon gas. Since the porous glass base material is an aggregation of glass particles, the time for dispersing is so small as to be ignored, compared to a sintered glass body. Therefore, at this time, the interior of the porous glass base material is such that, similar to the interior of the furnace core tube, air having a higher heat conductivity compared to argon gas is blended at a rate of 30%.

Thereafter, argon gas was kept flowing to the furnace core tube 11, while the temperature of the heater 12 was increased. In other words, before increasing the temperature of the heater 12, a gas replacement of the interior of the furnace core tube 11 was performed for 60 minutes with argon gas. Further, dehydration agent was blended with argon gas at an appropriate timing. The dehydration agent may be introduced at the same time as the argon gas is introduced.

Figure 2A:
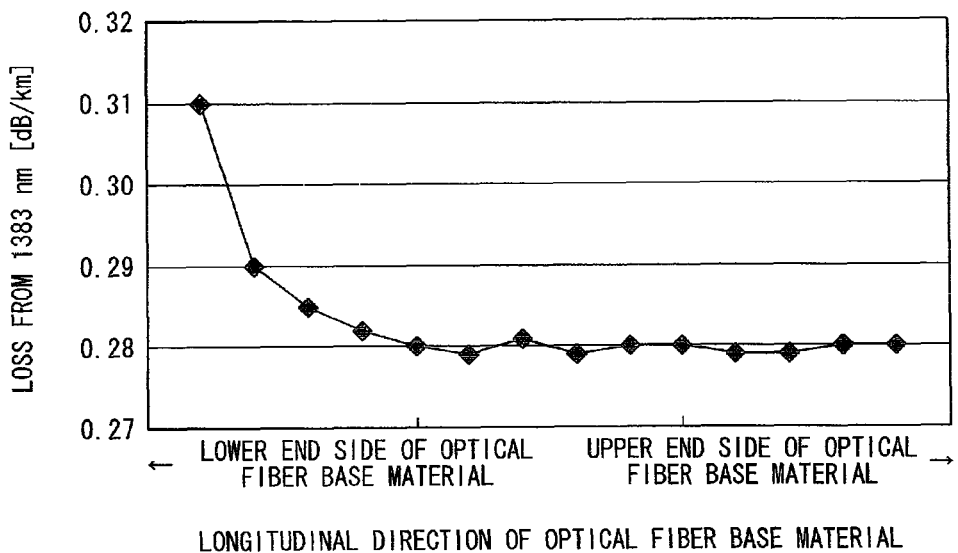
FIG. 2A is a graph showing a fluctuation in a longitudinal direction of a transmission loss at 1383 nm in a first comparative example.
Figure 2B:
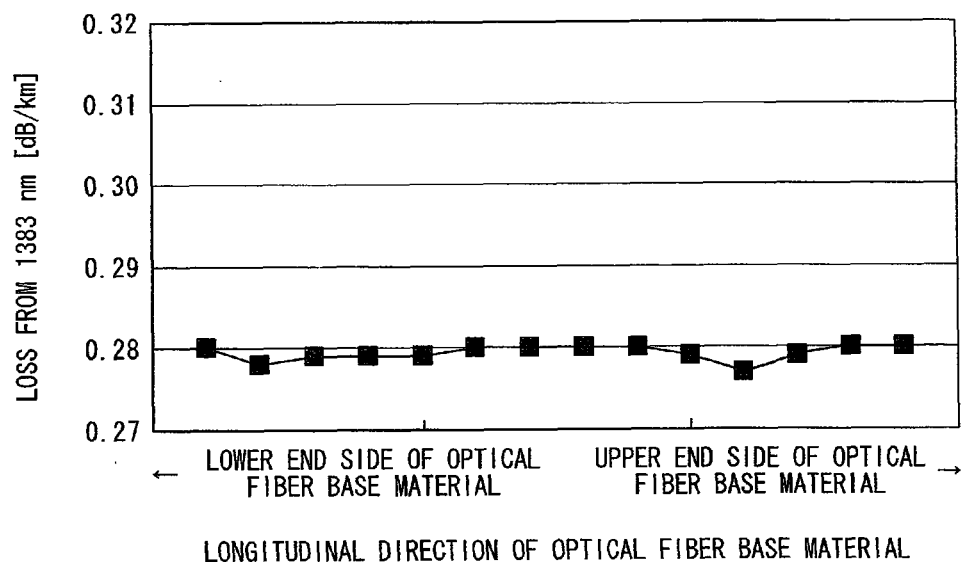
FIG. 2B is a graph showing a fluctuation in a longitudinal direction of a transmission loss at 1383 nm in a first working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas (the sintering temperature is approximately 1500° C. to 1600° C.). This optical fiber preform was turned into optical fiber in a spinning process, and a transmission loss at 1383 nm was measured, which is the absorption wave length of the hydroxyl group. The measurement result is shown in FIG. 2B as a fluctuation in a longitudinal direction of the optical fiber preform of a transmission loss at 1383 nm. The horizontal axis represents the longitudinal direction of the optical fiber preform. The lower end side of the optical fiber preform is a lower end side when the optical fiber preform is installed on the dehydration-sintering device. The upper end side of the optical fiber preform is an upper end side when the optical fiber preform is installed on the dehydration-sintering device. According to FIG. 2B, it is determined that there is a low transmission loss at 1383 nm, and that a dehydration is performed in a stable manner in the longitudinal direction of the optical fiber preform.

Hereinafter, the first comparative example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 180 minutes after the gas replacement was started.

When an oxygen density was measured 180 minutes after the gas replacement was started with an oxygen meter, which was previously installed on the dehydration-sintering device, the oxygen density was less than or equal to 1%. Accordingly, it may be presumed that greater than or equal to 95% of the volume of the furnace core tube is replaced with argon gas.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 2A as a fluctuation in a longitudinal direction of the optical fiber preform of a transmission loss at 1383 nm. According to FIG. 2A, it is determined that there is a high transmission loss at 1383 nm at a lower end side of the optical fiber preform, and that there is an inadequacy in dehydration.

Hereinafter, the second working example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 120 minutes after the gas replacement was started.

When an oxygen density was measured 120 minutes after the gas replacement was started with an oxygen meter, which was previously installed on the dehydration-sintering device, the oxygen density was approximately 2%. Accordingly, it may be presumed that 90% of the volume of the furnace core tube is replaced with argon gas.

Figure 2C:
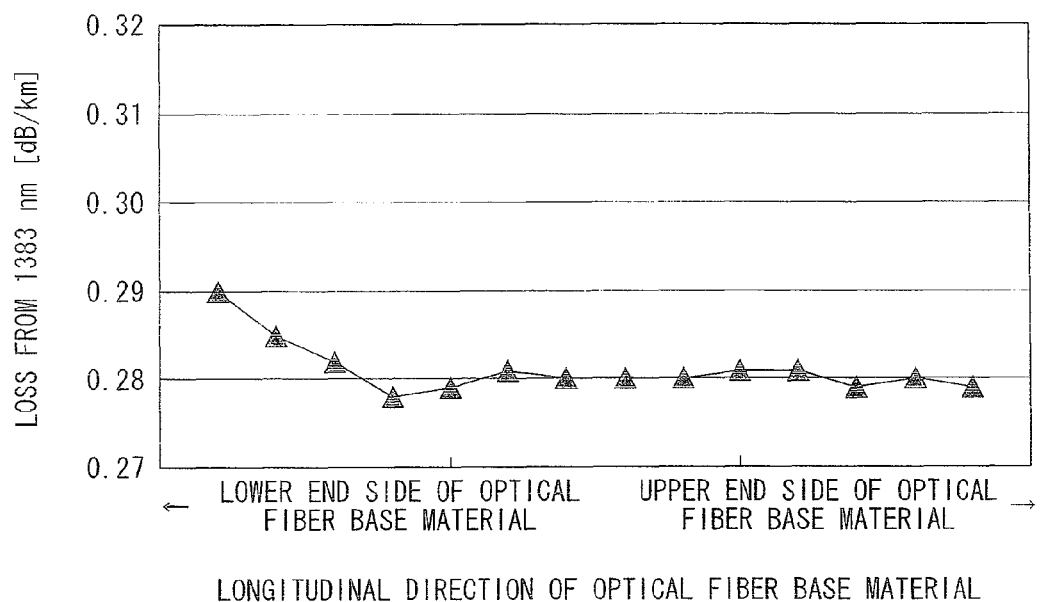
FIG. 2C is a graph showing a fluctuation in a longitudinal direction of a transmission loss at 1383 nm in a second working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 2C as a fluctuation in a longitudinal direction of the optical fiber preform of a transmission loss at 1383 nm. According to FIG. 2C, it is determined that the transmission loss at 1383 nm at the lower end side of the optical fiber preform is high, although it is not as high as in the first comparative example.

Hereinafter, the third working example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 90 minutes after the gas replacement was started.

When an oxygen density was measured 90 minutes after the gas replacement was started with an oxygen meter, which was previously installed on the dehydration-sintering device, the oxygen density was approximately 3%. Accordingly, it may be presumed that 85% of the volume of the furnace core tube is replaced with argon gas.

Figure 2D:
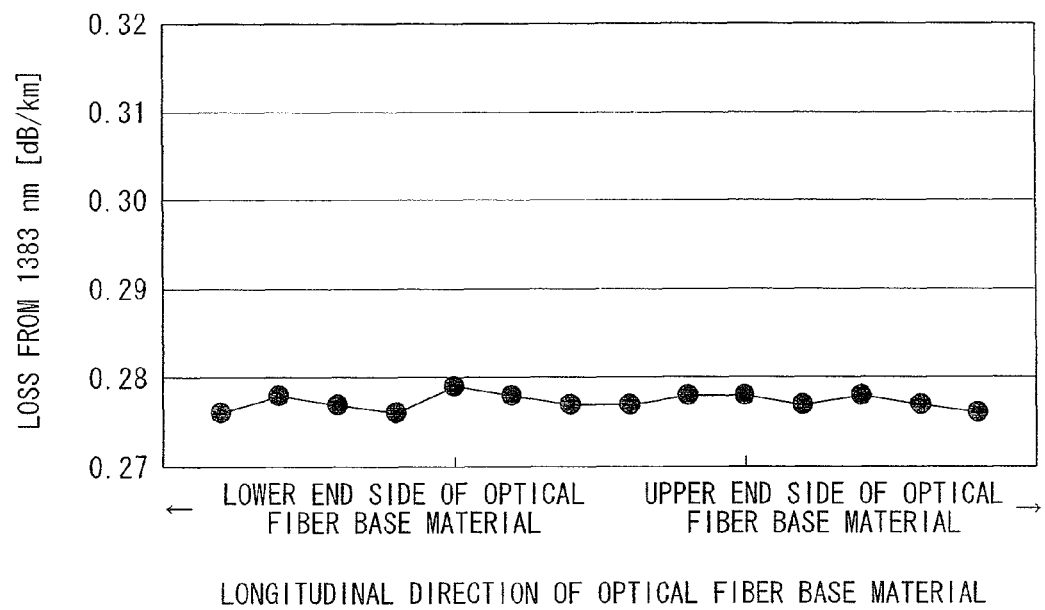
FIG. 2D is a graph showing a fluctuation in a longitudinal direction of a transmission loss at 1383 nm in a third working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 2D as a fluctuation in a longitudinal direction of the optical fiber preform of a transmission loss at 1383 nm. According to FIG. 2D, it is determined that the transmission loss at 1383 nm is low, and that dehydration is adequately performed in the longitudinal direction of the optical fiber preform.

Hereinafter, the fourth working example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 30 minutes after the gas replacement was started.

When an oxygen density was measured 30 minutes after the gas replacement was started with an oxygen meter, which was previously installed on the dehydration-sintering device, the oxygen density was approximately 9%. Accordingly, it may be presumed that 55% of the volume of the furnace core tube is replaced with argon gas.

Figure 3A:
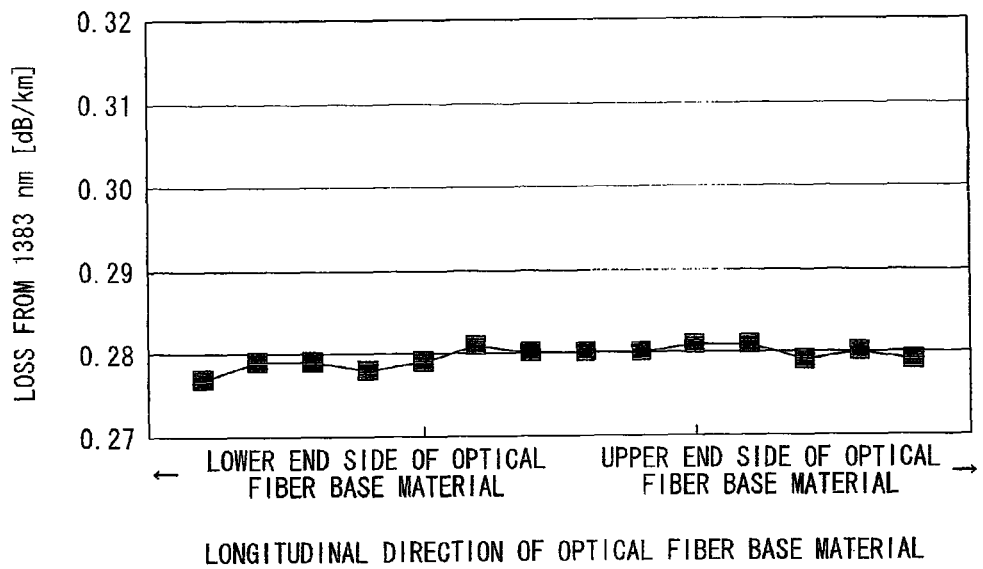
FIG. 3A is a graph showing a fluctuation in a longitudinal direction of a transmission loss at 1383 nm in a fourth working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 3A as a fluctuation in a longitudinal direction of the optical fiber preform of a transmission loss at 1383 nm. According to FIG. 3A, it is determined that the transmission loss at 1383 nm is low, and that dehydration is adequately performed in the longitudinal direction of the optical fiber preform.

Hereafter, the fifth working example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 20 minutes after the gas replacement was started.

When an oxygen density was measured 20 minutes after the gas replacement was started with an oxygen meter, which was previously installed on the dehydration-sintering device, the oxygen density was approximately 12%. Accordingly, it may be presumed that 40% of the volume of the furnace core tube is replaced with argon gas.

Figure 3B:
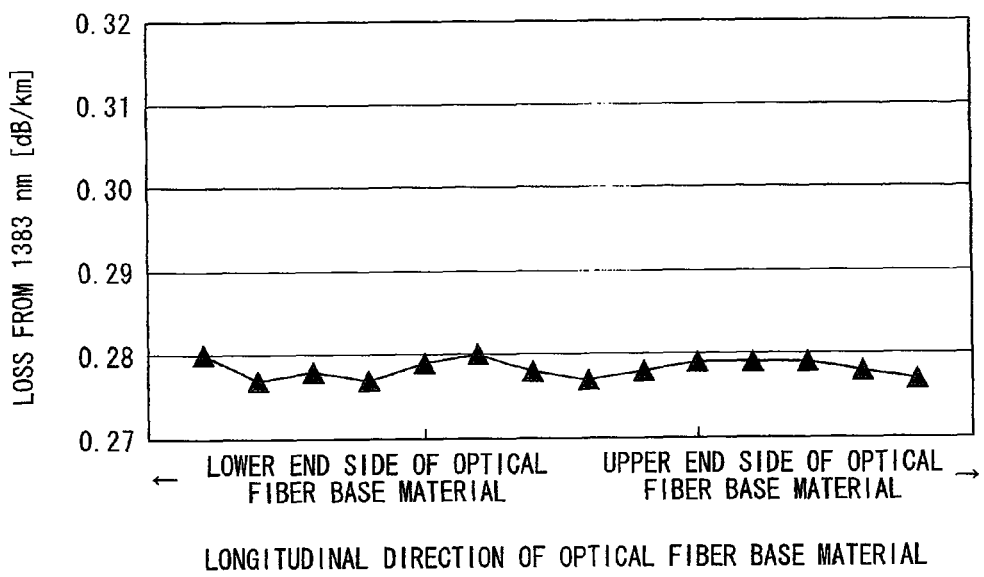
FIG. 3B is a graph showing a fluctuation in a longitudinal direction of a transmission loss at 1383 nm in a fifth working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 3B as a fluctuation in a longitudinal direction of the optical fiber preform of a transmission loss at 1383 nm. According to FIG. 3B, it is determined that the transmission loss at 1383 nm is low, and that dehydration is performed in a stable manner in the longitudinal direction of the optical fiber preform.

Hereinafter, the sixth working example is described.

After the porous glass base material is contained in the dehydration-sintering device similar to the first working example, a gas replacement inside the furnace core tube was commenced with argon gas before increasing the temperature of the heater of the dehydration-sintering device. The temperature of the heater was increased so that a predetermined dehydration temperature was reached 15 minutes after the gas replacement was started.

When an oxygen density was measured 15 minutes after the gas replacement was started with an oxygen meter, which was previously installed on the dehydration-sintering device, the oxygen density was approximately 13%. Accordingly, it may be presumed that 35% of the volume of the furnace core tube is replaced with argon gas.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. As a result, it was determined that the transmission loss at 1383 nm was low, and that dehydration was performed in a stable manner in the longitudinal direction of the optical fiber preform. Incidentally, when an external appearance of the optical fiber preform was observed after the sintering step, a creation of an infinitesimal amount of air bubble was observed inside the optical fiber preform. This is considered to be due to air which was remaining inside the porous glass base material at the time of the dehydration step. Incidentally, as described above, there was no influence on the characteristics of the optical fiber which was obtained.

Hereinafter, the seventh working example is described.

After the porous glass base material is contained in the dehydration-sintering device similar to the first working example, a gas purge inside the furnace core tube was performed with helium gas before increasing the temperature of the heater of the dehydration-sintering device. The purging was performed for five minutes. The helium gas was supplied at a flow velocity of 20 (l/min). At the same time as this supply, the gas in the interior was exhausted naturally. When an oxygen density was measured with an oxygen meter installed on the dehydration-sintering device, the oxygen density was less than or equal to 1%. Accordingly, it may be presumed that greater than or equal to 95% of the volume of the furnace core tube is purged with helium gas. Thereafter, a gas replacement inside the furnace core tube was commenced with argon gas. The temperature of the heater was increased so that a predetermined dehydration temperature was reached 15 minutes after the gas replacement was started.

When an oxygen density was measured 15 minutes after the gas replacement was started with an oxygen meter, which was previously installed on the dehydration-sintering device, the oxygen density was approximately 0.65%. Accordingly, it may be presumed that 35% of the volume of the furnace core tube is replaced with argon gas.

Figure 3C:
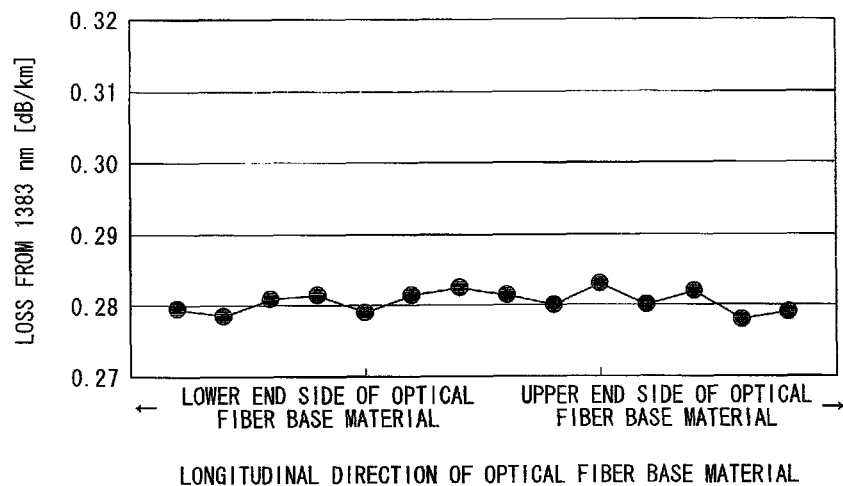
FIG. 3C is a graph showing a fluctuation in a longitudinal direction of a transmission loss at 1383 nm in a seventh working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 3C as a fluctuation in a longitudinal direction of the optical fiber preform of a transmission loss at 1383 nm. According to FIG. 3C, it is determined that the transmission loss at 1383 nm is low, and that dehydration is performed in a stable manner in the longitudinal direction of the optical fiber preform.

Hereinafter, the eighth working example is described.

After the porous glass base material is contained in the dehydration-sintering device similar to the first working example, a gas purge inside the furnace core tube was performed with helium gas before increasing the temperature of the heater of the dehydration-sintering device. The purging was performed for one minute. When an oxygen density was measured with an oxygen meter installed on the dehydration-sintering device, the oxygen density was less than or equal to 10%. Accordingly, it may be presumed that greater than or equal to 50% of the volume of the furnace core tube is purged with helium gas. Thereafter, a gas replacement inside the furnace core tube was commenced with argon gas. The temperature of the heater was increased so that a predetermined dehydration temperature was reached 15 minutes after the gas replacement was started.

When an oxygen density was measured 15 minutes after the gas replacement was started with an oxygen meter, which was previously installed on the dehydration-sintering device, the oxygen density was approximately 6.5%. Accordingly, it may be presumed that 35% of the volume of the furnace core tube is replaced with argon gas.

Figure 4A:
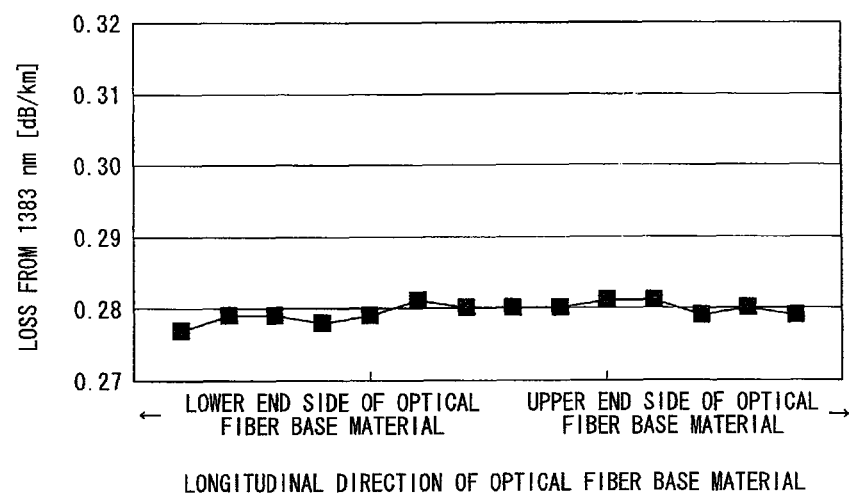
FIG. 4A is a graph showing a fluctuation in a longitudinal direction of a transmission loss at 1383 nm in an eighth working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 4A as a fluctuation in a longitudinal direction of the optical fiber preform of a transmission loss at 1383 nm. According to FIG. 4A, it is determined that the transmission loss at 1383 nm is low, and that dehydration is performed in a stable manner in the longitudinal direction of the optical fiber preform.

Hereinafter, the ninth working example is described.

After the porous glass base material is contained in the dehydration-sintering device similar to the first working example, a gas purge inside the furnace core tube was performed with nitrogen gas before increasing the temperature of the heater of the dehydration-sintering device. The purging was performed for one minute. When an oxygen density was measured with an oxygen meter installed on the dehydration-sintering device, the oxygen density was less than or equal to 10%. Accordingly, it may be presumed that greater than or equal to 50% of the volume of the furnace core tube is purged with nitrogen gas. Thereafter, a gas replacement inside the furnace core tube was commenced with argon gas. The temperature of the heater was increased so that a predetermined dehydration temperature was reached 30 minutes after the gas replacement was started.

When an oxygen density was measured 30 minutes after the gas replacement was started with an oxygen meter, which was previously installed on the dehydration-sintering device, the oxygen density was approximately 4.5%. Accordingly, it may be presumed that 55% of the volume of the furnace core tube is replaced with argon gas.

Figure 4B:
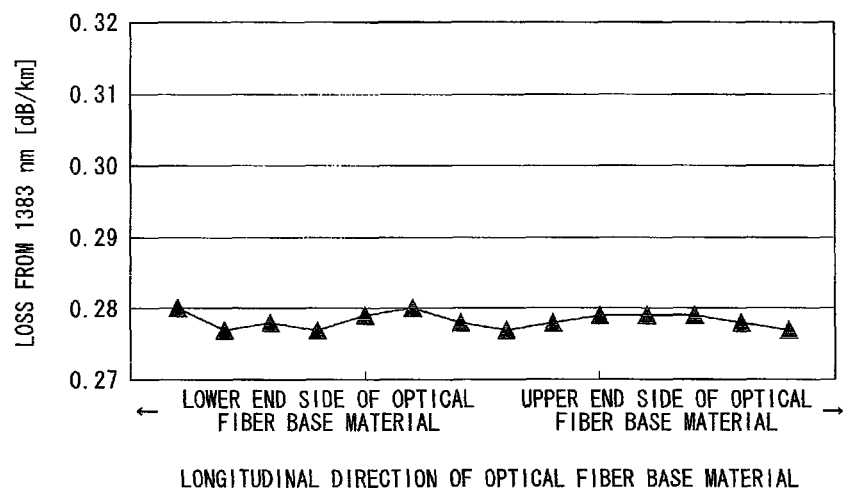
FIG. 4B is a graph showing a fluctuation in a longitudinal direction of a transmission loss at 1383 nm in a ninth working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 4B as a fluctuation in a longitudinal direction of the optical fiber preform of a transmission loss at 1383 nm. According to FIG. 4B, it is determined that the transmission loss at 1383 nm is low, and that dehydration is performed in a stable manner in the longitudinal direction of the optical fiber preform.

Hereinafter, the tenth working example is described.

After the porous glass base material is contained in the dehydration-sintering device similar to the first working example, a gas purge inside the furnace core tube was performed with nitrogen gas before increasing the temperature of the heater of the dehydration-sintering device. The purging was performed for one minute. When an oxygen density was measured with an oxygen meter installed on the dehydration-sintering device, the oxygen density was less than or equal to 10%. Accordingly, it may be presumed that greater than or equal to 50% of the volume of the furnace core tube is purged with nitrogen gas. Thereafter, a gas replacement inside the furnace core tube was commenced with argon gas. The temperature of the heater was increased so that a predetermined dehydration temperature was reached 15 minutes after the gas replacement was started.

When an oxygen density was measured 15 minutes after the gas replacement was started with an oxygen meter, which was previously installed on the dehydration-sintering device, the oxygen density was approximately 6.5%. Accordingly, it may be presumed that 35% of the volume of the furnace core tube is replaced with argon gas.

Figure 4C:
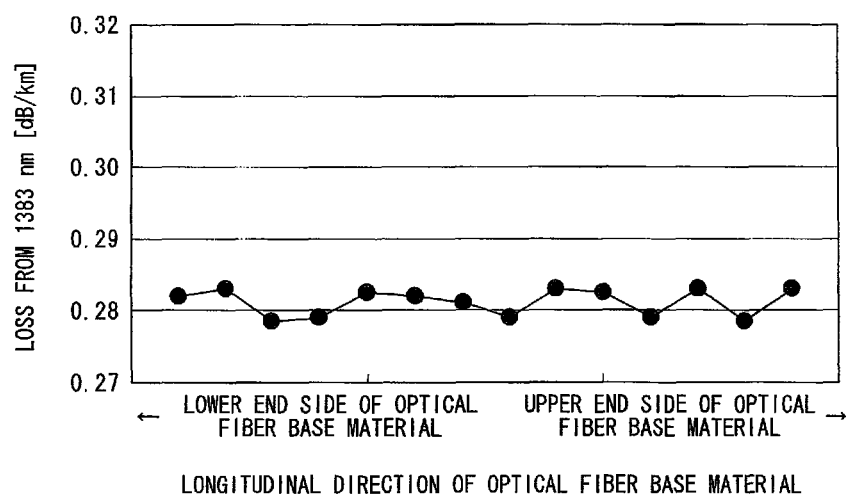
FIG. 4C is a graph showing a fluctuation in a longitudinal direction of a transmission loss at 1383 nm in a tenth working example of the present invention.

After the temperature of the heater was increased to a predetermined temperature, a dehydration step was performed by starting to lower the porous glass base material so that the porous glass base material passes a heater region. At this time, the lowering velocity is such that it takes approximately two hours for the porous glass base material to pass through the heater region. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 4C as a fluctuation in a longitudinal direction of the optical fiber preform of a transmission loss at 1383 nm. According to FIG. 4C, it is determined that the transmission loss at 1383 nm is low, and that dehydration is performed in a stable manner in the longitudinal direction of the optical fiber preform.

Hereinafter, the eleventh working example is described.

After the porous glass base material is contained in the dehydration-sintering device shown in FIG. 5, a gas replacement inside the furnace core tube was performed with argon gas before increasing the temperature of the heater of the dehydration-sintering device. The furnace core tube which was used has a dimension of 200 mm in inner diameter and 1500 mm in length. Argon gas was supplied at a flow velocity of 1.5 (l/min). At the same time as this supply, the interior gas was exhausted. The temperature of the heater was increased so that a predetermined dehydration temperature was reached 60 minutes after the gas replacement was started.

When an oxygen density was measured 60 minutes after the gas replacement was started with an oxygen meter, which was previously installed on the dehydration-sintering device, the oxygen density was approximately 6%. Accordingly, it may be presumed that 70% of the volume of the furnace core tube is replaced with argon gas.

Figure 6A:
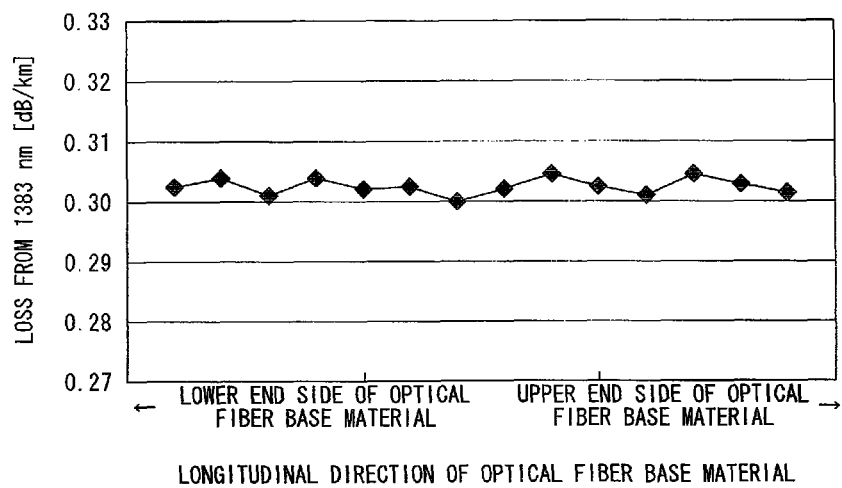
FIG. 6A is a graph showing a fluctuation in a longitudinal direction of a transmission loss at 1383 nm in a second comparative example of the present invention.
Figure 6B:
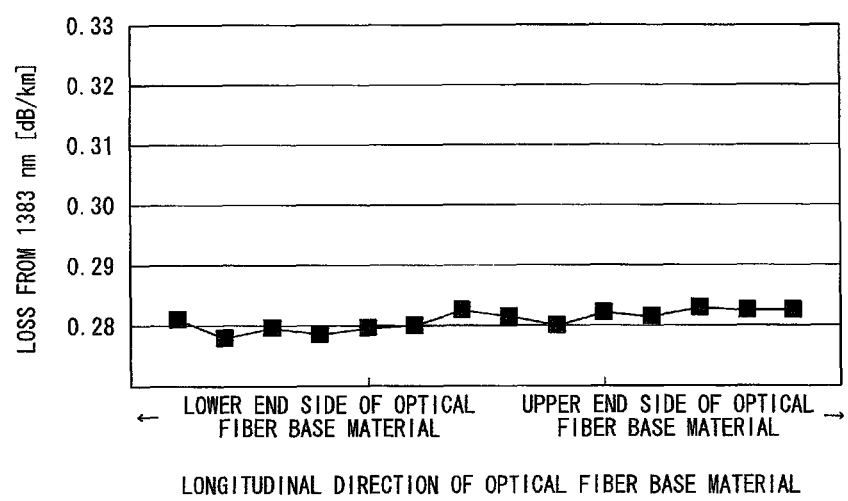
FIG. 6B is a graph showing a fluctuation in a longitudinal direction of a transmission loss at 1383 nm in an eleventh working example of the present invention.

After the temperature of the heater was increased to a predetermined temperature, a dehydration step was performed. At this time, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 6B as a fluctuation in a longitudinal direction of the optical fiber preform of a transmission loss at 1383 nm. The horizontal axis represents the longitudinal direction of the optical fiber preform. The lower end side of the optical fiber preform is a lower end side when the optical fiber preform is installed on the dehydration-sintering device. The upper end side of the optical fiber preform is an upper end side when the optical fiber preform is installed on the dehydration-sintering device. According to FIG. 6B, it is determined that there is a low transmission loss at 1383 nm, and that a dehydration is performed in a stable manner in the longitudinal direction of the optical fiber preform.

Hereinafter, the second comparative example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 180 minutes after the gas replacement was started.

When an oxygen density was measured 180 minutes after the gas replacement was started with an oxygen meter, which was previously installed on the dehydration-sintering device, the oxygen density was less than or equal to 1%. Accordingly, it may be presumed that greater than or equal to 95% of the volume of the furnace core tube is replaced with argon gas.

After the temperature of the heater was increased to a predetermined temperature, a dehydration step was performed. At this time, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 6A as a fluctuation in a longitudinal direction of the optical fiber preform of a transmission loss at 1383 nm. According to FIG. 6A, it is determined that there is a large amount of transmission loss throughout the entire length of the optical fiber preform, and that there is an inadequacy in dehydration.

Hereinafter, the twelfth working example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 120 minutes after the gas replacement was started.

When an oxygen density was measured 120 minutes after the gas replacement was started with an oxygen meter, which was previously installed on the dehydration-sintering device, the oxygen density was approximately 2%. Accordingly, it may be presumed that 90% of the volume of the furnace core tube is replaced with argon gas.

Figure 6C:
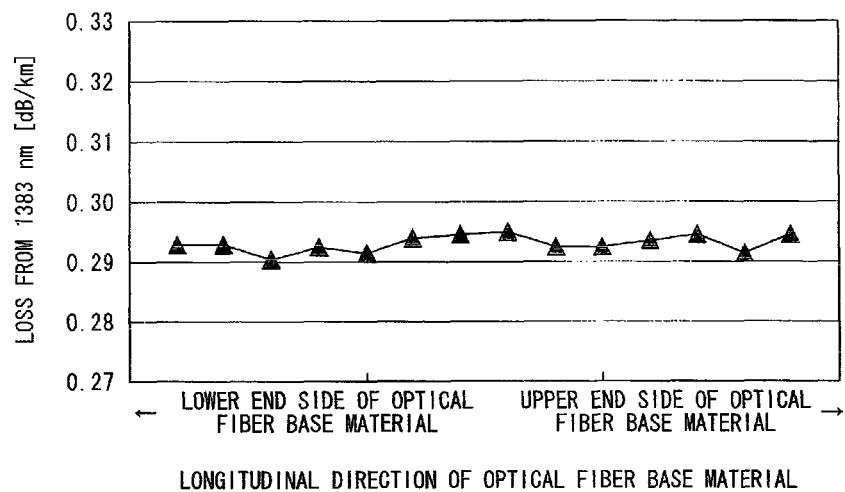
FIG. 6C is a graph showing a fluctuation in a longitudinal direction of a transmission loss at 1383 nm in a twelfth working example of the present invention.

After the temperature of the heater was increased to a predetermined temperature, a dehydration step was performed. Here, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 6C as a fluctuation in a longitudinal direction of the optical fiber preform of a transmission loss at 1383 nm. According to FIG. 6C, it is determined that the transmission loss at 1383 nm is high throughout the entire length of the optical fiber preform, although it is not as high as in the second comparative example.

Hereinafter, the thirteenth working example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 90 minutes after the gas replacement was started.

When an oxygen density was measured 90 minutes after the gas replacement was started with an oxygen meter, which was previously installed on the dehydration-sintering device, the oxygen density was approximately 3%. Accordingly, it may be presumed that 85% of the volume of the furnace core tube is replaced with argon gas.

Figure 6D:
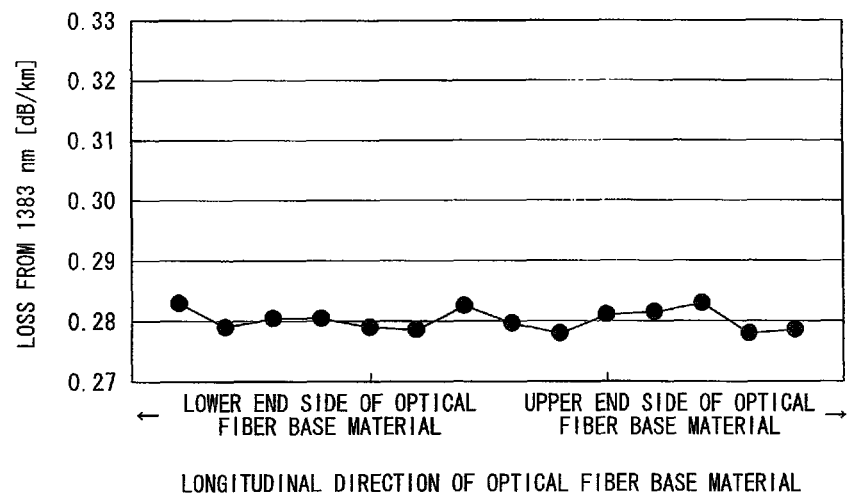
FIG. 6D is a graph showing a fluctuation in a longitudinal direction of a transmission loss at 1383 nm in a thirteenth working example of the present invention.

After the temperature of the heater was increased to a predetermined temperature, a dehydration step was performed. Here, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 6D as a fluctuation in a longitudinal direction of the optical fiber preform of a transmission loss at 1383 nm. According to FIG. 6D, it is determined that the transmission loss at 1383 nm is low, and that dehydration is performed in a stable manner in the longitudinal direction of the optical fiber preform.

Hereinafter, the fourteenth working example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 30 minutes after the gas replacement was started.

When an oxygen density was measured 30 minutes after the gas replacement was started with an oxygen meter, which was previously installed on the dehydration-sintering device, the oxygen density was approximately 9%. Accordingly, it may be presumed that 55% of the volume of the furnace core tube is replaced with argon gas.

Figure 7A:
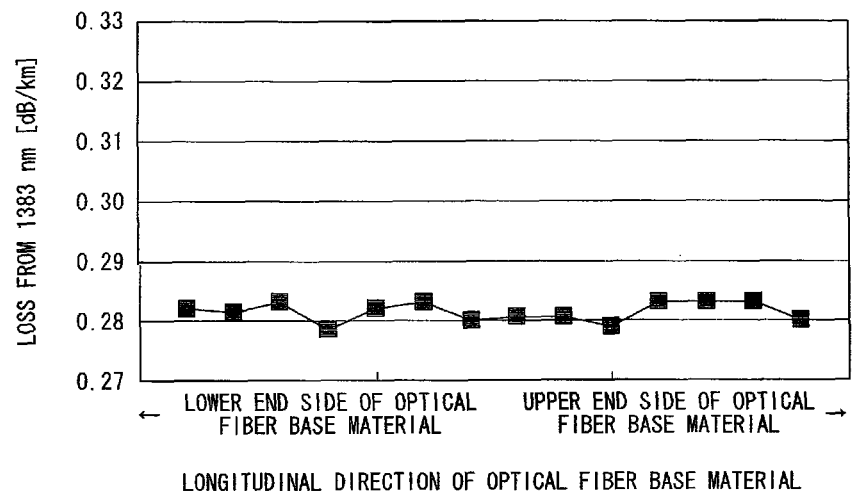
FIG. 7A is a graph showing a fluctuation in a longitudinal direction of a transmission loss at 1383 nm in a fourteenth working example of the present invention.

After the temperature of the heater was increased to a predetermined temperature, a dehydration step was performed. Here, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 7A as a fluctuation in a longitudinal direction of the optical fiber preform of a transmission loss at 1383 nm. According to FIG. 7A, it is determined that the transmission loss at 1383 nm is low, and that dehydration is performed in a stable manner in the longitudinal direction of the optical fiber preform.

Hereinafter, the fifteenth working example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 20 minutes after the gas replacement was started.

When an oxygen density was measured 20 minutes after the gas replacement was started with an oxygen meter, which was previously installed on the dehydration-sintering device, the oxygen density was approximately 12%. Accordingly, it may be presumed that 40% of the volume of the furnace core tube is replaced with argon gas.

Figure 7B:
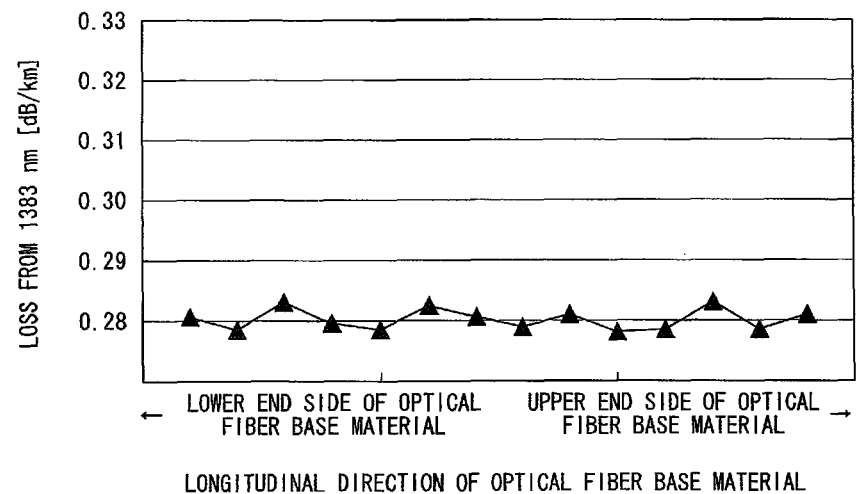
FIG. 7B is a graph showing a fluctuation in a longitudinal direction of a transmission loss at 1383 nm in a fifteenth working example of the present invention.

After the temperature of the heater was increased to a predetermined temperature, a dehydration step was performed. Here, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. The measurement result is shown in FIG. 7B as a fluctuation in a longitudinal direction of the optical fiber preform of a transmission loss at 1383 nm. According to FIG. 7B, it is determined that the transmission loss at 1383 nm is low, and that dehydration is performed in a stable manner in the longitudinal direction of the optical fiber preform.

Hereinafter, the sixteenth working example is described.

After the porous glass base material is contained in the dehydration-sintering device similar to the eleventh working example, a gas replacement inside the furnace core tube was commenced with argon gas before increasing the temperature of the heater of the dehydration-sintering device. The temperature of the heater was increased so that a predetermined dehydration temperature was reached 15 minutes after the gas replacement was started.

When an oxygen density was measured 15 minutes after the gas replacement was started with an oxygen meter, which was previously installed on the dehydration-sintering device, the oxygen density was approximately 13%. Accordingly, it may be presumed that 35% of the volume of the furnace core tube is replaced with argon gas.

After the temperature of the heater was increased to a predetermined temperature, a dehydration step was performed. Here, the duration time of the dehydration step was approximately two hours. After the dehydration step, a sintering step was performed inside the helium gas. This optical fiber preform was turned into optical fiber in a spinning process, and a transmission loss at 1383 nm was measured, which is the absorption wave length of the hydroxyl group. As a result, it was determined that the transmission loss at 1383 nm was low, and that dehydration was performed in a stable manner in the longitudinal direction of the optical fiber preform. Incidentally, when an external appearance of the optical fiber preform was observed after the sintering step, a creation of an infinitesimal amount of air bubble was observed inside the optical fiber preform. This is considered to be due to air which was remaining inside the porous glass base material at the time of the dehydration step. Incidentally, as described above, there was no influence on the characteristics of the optical fiber which was obtained.

Accordingly, it is possible to come to a conclusion that a cause of the inadequacy of dehydration of the porous glass base material under the argon gas atmosphere is the influence from the heat transfer coefficient of the argon gas. Therefore, the inadequacy of dehydration may be improved by including in the porous glass base material, a gas having a higher heat transfer coefficient compared to argon gas.

In the first comparative example, it is hard for heat to be conducted to an interior of the porous glass base material because argon gas is included in the dehydration-sintering device by a percentage of greater than or equal to 95%. Further, even at a time when the lowering of the porous glass base material is started, the temperature at a center of the porous glass base material is inadequate. Therefore, dehydration was inadequate at a lower end side of the porous glass base material. However, at a central portion of the porous glass base material, the dehydration was not inadequate because there was heat conduction from a portion which had already been heated, and because there was radiation from the heater. In addition, the concentration of argon gas increases as time passes. However, to the contrary, since the heat transfer coefficient is low, it becomes difficult for the temperature of the interior portion to drop. Meanwhile, in the first working example, the concentration of the high heat conductivity gas is high. Thus, even at a time when the lowering of the porous glass base material is started, the temperature at a center of the porous glass base material becomes a temperature which is adequate for dehydration. As a result, inadequacy in dehydration did not occur even at a lower end side of the porous glass base material.

In the second comparative example, argon gas is included in the dehydration-sintering device by a percentage of greater than or equal to 95%. Therefore, it is hard for heat to be conducted to an interior of the porous glass base material. Further, the porous glass base material is not lowered. Therefore, the concentration of argon gas becomes high before the temperature of an interior portion of the porous glass base material increases. Thus, the interior portion of the porous glass base material does not reach an adequate temperature. As a result, the dehydration over the entire length became inadequate. Meanwhile, in the eleventh working example, the concentration of gas having a high conductivity is high. Thus, even at a time when the dehydration step is started, the temperature at a center of the porous glass base material becomes a temperature which is adequate for dehydration. As a result, inadequacy in dehydration did not occur in any portion of the entire length of the porous glass base material.

What is claimed is:

1. A method for producing an optical fiber preform, comprising:
    providing a porous glass base material to a furnace core tube of a dehydration-sintering furnace, the furnace core tube being filled with air having a heat conductivity higher than a heat conductivity of argon gas;
    beginning to replace the air in the furnace core tube with argon gas;
    beginning to allow a temperature of the porous glass base material to increase when 30% to 90% of a volume of the air in the furnace core tube is replaced with argon gas so that 70% to 10% of a volume of the air remains in the furnace core tube in a case where a total volume of the air and the argon gas is defined as 100% by volume in the furnace core tube;
    heating to dehydrate the porous glass base material using a dehydrating agent, the dehydrating agent being diluted by argon gas; and
    sintering the dehydrated porous glass base material.

2. A method for producing an optical fiber preform, comprising:
    providing a porous glass base material to a furnace core tube of a dehydration-sintering furnace, the furnace core tube being filled with air in the dehydration-sintering furnace;
    preparing a high heat conductivity gas having a heat conductivity higher than a heat conductivity of argon gas, the high heat conductivity gas being different from air;
    purging the high heat conductivity gas into the air filled furnace core tube and replacing 50% to 95% of a volume of the air presented in the furnace core tube with the high heat conductivity gas, the furnace core tube thus being filed with a mixture gas of the air and the high heat conductivity gas;
    beginning to introduce argon gas into the furnace core tube;
    beginning to allow a temperature of the porous glass base material to increase when 30% to 90% of a volume of the mixture gas in the furnace core tube is replaced with argon gas so that 70% to 10% of a volume of the mixture gas remains in the furnace core tube in a case where a total volume of the mixture gas and the argon gas is defined as 100% by volume in the furnace core tube;
    heating to dehydrate the porous glass base material heated using a dehydrating agent, the dehydrating agent being diluted by argon gas; and
    sintering the dehydrated porous glass base material.

3. The method for producing the optical fiber preform according to claim 2, wherein the high heat conductivity gas is at least one type selected from the group consisting of a helium gas, nitrogen gas, and a neon gas.

4. The method for producing the optical fiber preform according to claim 2, wherein the temperature of the porous glass base material begins to be increased when 40% to 80% of a volume of the mixture gas in the furnace core tube is replaced with argon gas.

* * * * *